US008443435B1

(12) United States Patent
Schroeder (10) Patent No.: US 8,443,435 B1
(45) Date of Patent: May 14, 2013

(54) VPN RESOURCE CONNECTIVITY IN LARGE-SCALE ENTERPRISE NETWORKS

(75) Inventor: Hartmut Schroeder, Hamburg (DE)

(73) Assignee: Juniper Networks, Inc., Sunnyvale, CA (US)

( * ) Notice: Subject to any disclaimer, the term of this patent is extended or adjusted under 35 U.S.C. 154(b) by 356 days.

(21) Appl. No.: 12/959,143

(22) Filed: Dec. 2, 2010

(51) Int. Cl.
*H04L 29/00* (2006.01)

(52) U.S. Cl.
USPC .......................................................... 726/15

(58) Field of Classification Search ...................... 726/15
See application file for complete search history.

(56) References Cited

U.S. PATENT DOCUMENTS

| 6,473,863 | B1 | 10/2002 | Genty et al. |
| 6,675,225 | B1 | 1/2004 | Genty et al. |
| 6,751,190 | B1 | 6/2004 | Swallow |
| 6,915,436 | B1 | 7/2005 | Booth, III et al. |
| 7,673,048 | B1 | 3/2010 | O'Toole, Jr. et al. |
| 7,756,510 | B2 * | 7/2010 | Lee et al. ...................... 455/411 |
| 7,849,505 | B2 * | 12/2010 | Satterlee et al. ................ 726/15 |
| 7,890,992 | B2 * | 2/2011 | Schwartzman et al. .......... 726/4 |
| 2002/0144144 | A1 * | 10/2002 | Weiss et al. .................... 713/201 |
| 2002/0152320 | A1 | 10/2002 | Lau |
| 2003/0088698 | A1 | 5/2003 | Singh et al. |
| 2003/0177396 | A1 | 9/2003 | Bartlett et al. |
| 2004/0225895 | A1 | 11/2004 | Mukherjee et al. |
| 2004/0268142 | A1 | 12/2004 | Karjala et al. |
| 2005/0021844 | A1 | 1/2005 | Puon et al. |
| 2005/0125542 | A1 | 6/2005 | Zhu |
| 2005/0185644 | A1 | 8/2005 | Tsuji et al. |
| 2006/0185012 | A1 | 8/2006 | Olivereau et al. |
| 2006/0230446 | A1 | 10/2006 | Vu |
| 2006/0282889 | A1 | 12/2006 | Brown et al. |
| 2007/0094723 | A1 | 4/2007 | Short et al. |
| 2008/0034072 | A1 * | 2/2008 | He et al. ........................ 709/223 |
| 2008/0144625 | A1 * | 6/2008 | Wu et al. ....................... 370/392 |
| 2008/0201486 | A1 * | 8/2008 | Hsu et al. ...................... 709/238 |
| 2010/0278181 | A1 | 11/2010 | Liu et al. |

OTHER PUBLICATIONS

U.S. Appl. No. 12/967,977, by Vikki Yin Wei, filed Dec. 14, 2010.
802.1X IEEE standard for Local and Metropolitan Area Networks, Port Based Network Access Control, Dec. 13, 2004, 179 pp.
Juniper Networks Secure Access Administration Guide Release 6.5, 2008, 772 pp.

* cited by examiner

*Primary Examiner* — Michael S McNally
(74) *Attorney, Agent, or Firm* — Shumaker & Sieffert, P.A.

(57) ABSTRACT

A VPN handler of a client device is described that provides VPN connectivity by automatically creating multiple split VPN tunnels that provide direct access to different VPN concentrators of an enterprise based on specific resources requested by the client device. A local VPN concentrator normally used by the client device may provide the VPN handler with a resource list that provides a mapping of the resources of the enterprise network to the multiple VPN concentrators that have been deployed to provide secure access to those resources. The local VPN concentrator may dynamically update the resource list on the client device so as to control the construction and use of the split VPN tunnels by the VPN handler based on changes to the enterprise network. The split tunnel approach may be transparent to applications executing on the client device and may be easily deployed to the client devices of the enterprise.

27 Claims, 6 Drawing Sheets

VPN RESOURCE CONNECTIVITY IN LARGE-SCALE ENTERPRISE NETWORKS

TECHNICAL FIELD

The invention relates to computer networks, and particularly to virtual private networks.

BACKGROUND

Enterprises may use virtual private networks (VPN) to allow employees to securely communicate with enterprise resources over public networks. For example, an enterprise may deploy a VPN concentrator, also referred to as a VPN gateway, to provide secure access to the enterprise resources. An employee using a client device at a remote location may establish a VPN connection to the VPN gateway through a public network, such as the Internet. The use of a VPN provides assurances that others on the public network cannot intercept, read, or reuse communications sent on the VPN.

In some cases, large-scale enterprises may deploy multiple VPN concentrators. For example, a global enterprise having physical network resources in disparate geographic regions may deploy multiple VPN concentrators for its employees to access. Although the enterprise network may virtually appear as a single network, the physical network resources tend to be physically arranged into different networks, each network having a VPN concentrator to provide secure access over the public networks. The enterprise typically establishes a full or partial mesh of secure connections to tunnel enterprise communications between the VPN concentrators, either through the public network or via private lines (e.g., Frame relay interconnections). In this way the enterprise provides connectivity between the geographically separate networks of the enterprise. Employee access is directed to the nearest VPN concentrator since most of the needed resources are expected to be stored within the local resources of the enterprise. As such, the client device and the local VPN concentrator operate as endpoints for the employee's VPN connection, and the nearest VPN concentrator exposes the local enterprise resources to the client device. In the event the employee requires access to enterprise resources that are located in a different one of the physical networks of the enterprise, the local VPN concentrator with which he is securely communicating operates as a cross-connect to the secure connections to the other VPN concentrator for the other physical network. As such, the local VPN concentrator operates as an endpoint for the secure connection with the user and for the secure VPN connections to the other VPN concentrators and relays communications between the secure connections. In this way, the employee may access any of the protected resources of the enterprise.

SUMMARY

In general, techniques are described for managing VPN access to enterprise resources for large-scale enterprises that have multiple VPN concentrators. For example, a VPN handler of a client device is described that provides VPN connectivity by automatically creating multiple split VPN tunnels that provide direct access to different VPN concentrators of the enterprise based on specific resources requested by the client device. A local VPN concentrator normally used by the client device may provide the VPN handler with a resource list that provides a mapping of the resources of the enterprise network to the multiple VPN concentrators that have been deployed to provide secure access to those resources. The local VPN concentrator may dynamically update the resource list on the client device so as to control the construction and use of the split VPN tunnels by the VPN handler based on changes to the enterprise network. The split tunnel approach may be transparent to applications executing on the client device and may be easily deployed to the client devices of the enterprise.

The techniques may provide one or more advantages. For example, the techniques may provide VPN connectivity for large scale enterprises that employ multiple VPN concentrators, yet may avoid burdening local VPN concentrators from having to operate as proxies between client VPN connections and the mesh of inter-concentrator VPN connections. This may reduce bandwidth consumption of the local VPN concentrators as well as possibly reduce latency experienced by the client device due to the local VPN concentrator hairpinning any traffic directed to resources associated with remote VPN concentrators.

In one embodiment, a method comprises establishing, with a virtual private network (VPN) handler executing on a client device, a first VPN connection to a first VPN concentrator of an enterprise network and receiving, with the VPN handler, a resource list from the first VPN concentrator, wherein the resource list specifies a set of resources of the enterprise network and a second VPN concentrator of the enterprise network. The method includes processing an outbound network communication with the VPN handler to determine a target resource of the enterprise network for the outbound network communication and comparing the target resource to the resource list to determine whether the target resource of the enterprise network is serviced by the first VPN concentrator. The method further includes, when the target resource is serviced by the first VPN concentrator, forwarding the outbound network communication from the client device to the first VPN concentrator via the first VPN connection and, when the target resource is not serviced by the first VPN concentrator, automatically establishing a second VPN connection from the VPN handler of the client device to the second VPN concentrator of the enterprise network and forwarding the outbound network communication to the second VPN concentrator via the second VPN connection.

In another embodiment, a network device comprises a microprocessor, an operating system executing on the microprocessor to provide an operating environment for application software, and a virtual private network (VPN) network handler executing on the microprocessor to establish a first VPN connection with a first VPN concentrator of an enterprise network for securely tunneling network packets between the network device and the first VPN concentrator. Upon establishing the VPN connection, the VPN network handler receives a resource list from the first VPN concentrator that specifies a set of resources of the enterprise network and a second VPN concentrator of the enterprise network. The VPN network handler processes an outbound network communication from the application software by determining a target resource of the enterprise network for the outbound network communication and automatically establishing a VPN connection from the VPN handler to the second VPN concentrator of the enterprise network when the target resource is not serviced by the first VPN concentrator.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
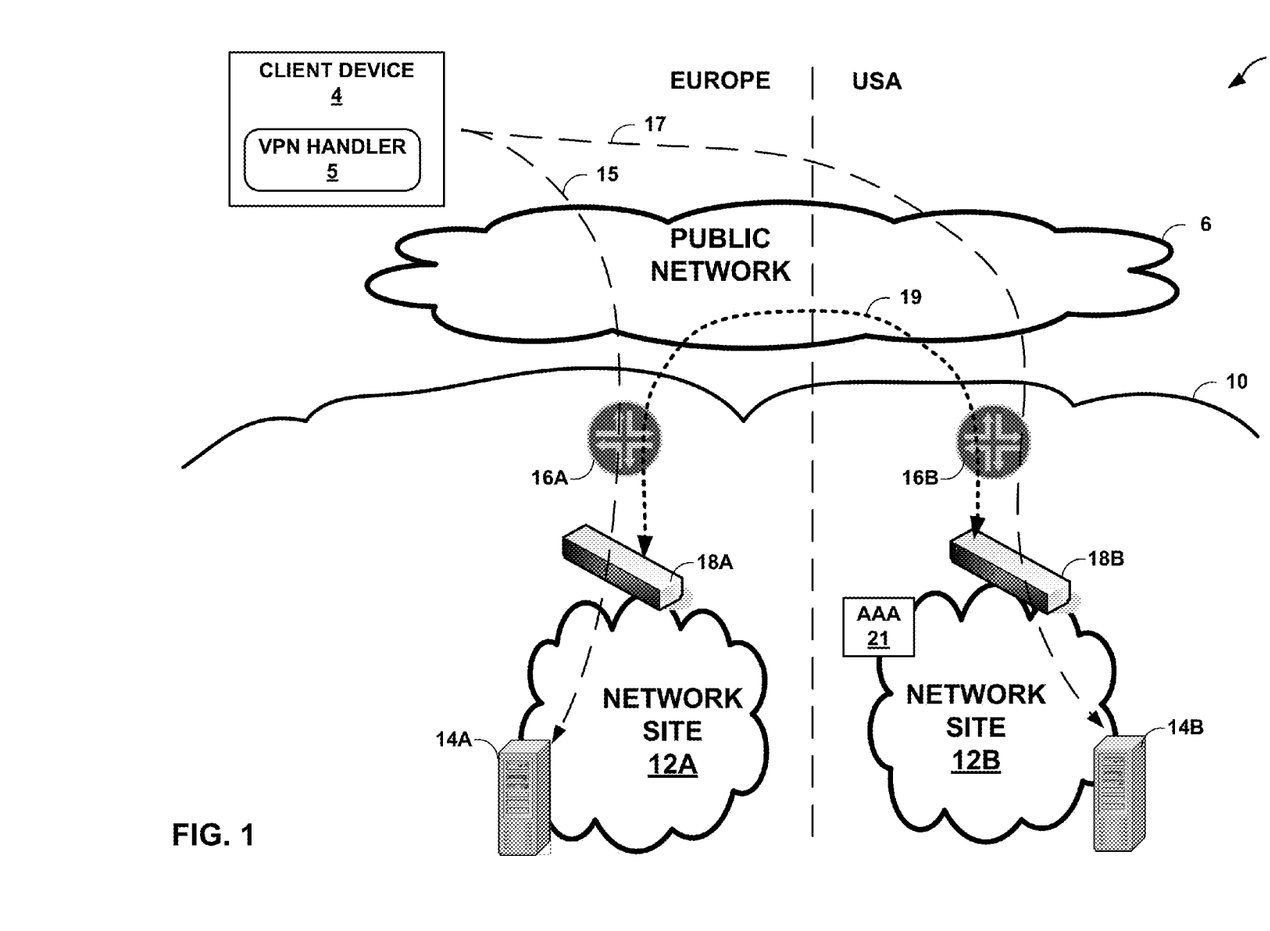
FIG. 1 is a block diagram illustrating an example network environment in which a client device provides VPN connectivity in accordance with the techniques herein described

FIG. 1 is a block diagram illustrating an example network environment 2 in which a client device 4 provides VPN connectivity in accordance with the techniques herein described. In this example, client device 4 accesses a global enterprise network 10 through public network 6. Enterprise network 10 includes geographically separated network sites 12A, 12B.

VPN concentrators 18A, 18B are positioned between routers 16A, 16B, respectively, and provide secure and controlled access via public network 6 to resources 14A, 14B of network sites 12A, 12B. In one example, each of VPN concentrators 18 is a secure sockets layer VPN (SSL VPN) appliance that provides VPN services to a number of remote client devices, such as client device 4. VPN concentrators 18 may be connected by a secure cross connection 19 to provide connectivity between networks sites 12A, 12B. That is, VPN concentrators 18 may be two of a plurality of VPN concentrators that are deployed by the enterprise to provide secure access to the enterprise resources via public network 6. In some cases, enterprise communications may be communicated between VPN concentrators 18 via secure data connection 19 to provide connectivity between geographically separate network sites 12A, 12B. Secure data connection 19 may take the form of an encrypted tunnel through public network 19, and may utilize an MPLS label switched path (LSP) between routers 16. In some cases, secure data connection 19 may be provided by private lines, e.g., a Frame relay interconnection. Local VPN concentrator 18A operates as an endpoint for secure connection 15 with client device 4 and for secure data connection 19 to VPN concentrator 18B and, in some cases, may relay communications between the secure connections. Example details on SSL VPN appliances and operations can be found in "Juniper Networks Secure Access Administration Guide, Release 6.5," Juniper Networks, Inc., 2008, which is incorporated herein by reference in its entirety. In other examples, VPN concentrators 18 may be incorporated within other devices, such as an intrusion detection and prevention (IDP) systems, firewalls, unified threat management (UTM) devices, routers, or other network devices.

In general, client device 4 may be a personal computer or mobile device associated with an individual employee. In order to access data and services provided by resources 14, client device 4 invokes VPN handler 5 that authenticates to VPN concentrator 18A and establishes a secure communication channel through public network 6 to VPN concentrator 18A. In this sense, VPN concentrator 18A is the "local" VPN concentrator 18A for client device 4 and provides access to resources 14A typically used by the client device, such as a home page for a user of the device, email services for the user, and the like. In general, resources 14 may be web servers, application servers, database servers, file servers, software applications or web services, or any other electronic resource. Client device 4 may be any device suitable for executing VPN handler 5, for instance, a personal computer, a personal digital assistant (PDA), a smart-phone, a laptop computer, a video-game console, an application running thereon (e.g., a web browser), or other type of computing device or application that may request access to any of resources 14. Example details of a VPN handler for a smart-phone or other mobile cellular device can be found in U.S. Provisional Patent Application 61/398,758, entitled "MULTI-SERVICE NETWORK CLIENT FOR MOBILE DEVICE," the entire contents of which are incorporated herein by reference.

To access resources 14A within enterprise network 10, client device 4 establishes a secure data connection 15 to VPN concentrator 18A. VPN handler 5 provides all low-level communication handling for access to enterprise network 10 via secure data connection 15. For example, VPN handler 5 handles interaction and authentication to VPN concentrator 18A, establishment and deconstructing of a secure data connection conforming to a security scheme, formation of encrypted outbound packets to be tunneled, and processing of inbound packets to decrypt those packets received from the tunnel. Secure data connection 15 may comprise, for example, a secure data connection conforming to a security scheme, such as Secure Sockets Layer (SSL) or Internet Protocol Security (IPSec) protocols. That is, an SSL VPN may be used to tunnel IP packets on top of a Layer 4 connection oriented protocol, e.g., Transmission Control Protocol (TCP). Alternatively, an IPSec VPN may be established to tunnel encrypted IP packets, i.e., Encapsulation Security Payload (ESP) packets, on top of a connection-less protocol, e.g., IP or User Datagram Protocol (UDP).

In either case, VPN concentrator 18A may require user credentials to establish authentication and authorization. Credentials may include, for example, a username-password pair, a biometric identifier, a data stored on a smart card, a one-time password token or a digital certificate. In some cases, VPN handler 5 may present a login page for receiving credentials from the user. For SSL-VPNs, when accessing enterprise network 10, a user associated with client device 4 may direct a web browser executing on the client device to a Uniform Resource Locator (URL) associated with the enterprise. In this case, VPN concentrator 18A may presents a web page on the endpoint computing device via the web browser to capture the credentials required from the user. Based on the provided credentials, VPN concentrator 18A authorizes or denies access to enterprise network 10. In some examples, VPN concentrator 18A may communicate with authentication, authorization and accounting (AAA) server 21 to authenticate the credentials. AAA server 21 may execute on VPN concentrator 18A or on a separate network device and may be, for example, a Remote Authentication Dial-In User Service (RADIUS) server. VPN concentrator 18A and remote client device 4 may also negotiate other aspects of data connection 14 that ensure security, including the type/version of an encryption algorithm, and symmetric keys for encrypting/decryption data transported via secure data connection 15.

In accordance with the techniques described herein, VPN handler 5 of client device 4 interacts with VPN concentrators 18 to automatically manage access to enterprise resources 14 for large-scale enterprise network 10. For example, under the direction of local VPN concentrator 18A, VPN handler 5 may provide VPN connectivity by automatically creating multiple split VPN tunnels as secure data connections 15, 17 to provide direct access to VPN concentrators 18 based on the specific resources 14 requested by client device 4. Local VPN concentrator 18A normally used by client device 4 may provide VPN handler 5 with a resource list that provides a mapping of resources 14 of enterprise network 10 to the multiple VPN concentrators 18 that have been deployed to provide secure access to those resources. Local VPN concentrator 18A may dynamically update the resource list on client device 4 so as to control the construction and use of the split VPN tunnels (i.e., secure data connections 15, 17) by VPN handler 5 based on changes to the enterprise network and/or current loading conditions. The split tunnel approach may be transparent to software applications executing on client device 4 and may be easily deployed to client devices of the enterprise.

Figure 2:
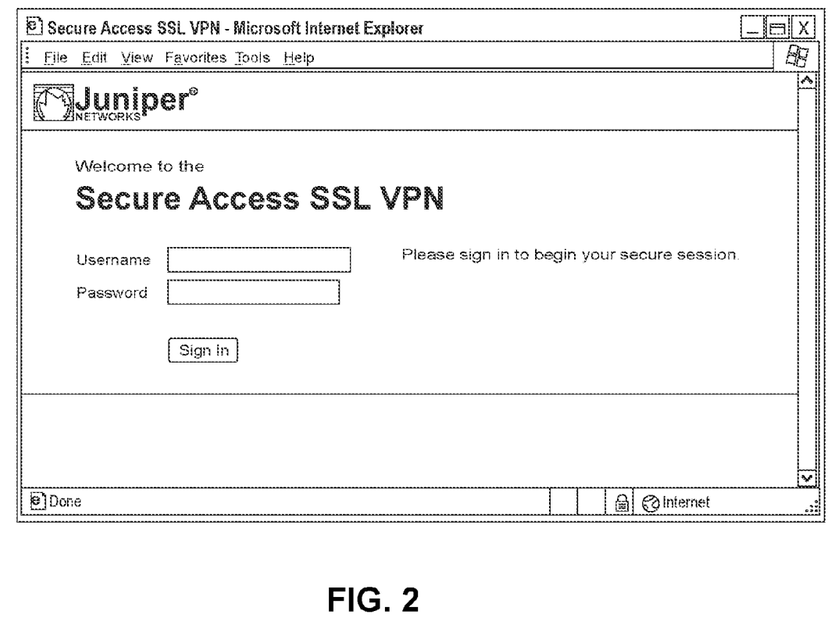
FIG. 2 shows an example login web page presented to a user via a web browser when accessing a VPN concentrator via a client device.

FIG. 2 shows an example login web page presented to the user via the web browser when accessing VPN concentrator 18A via client device 4. Upon proper authentication, VPN concentrator 18A presents a default user home web page on the client device via the web browser.

Figure 3:
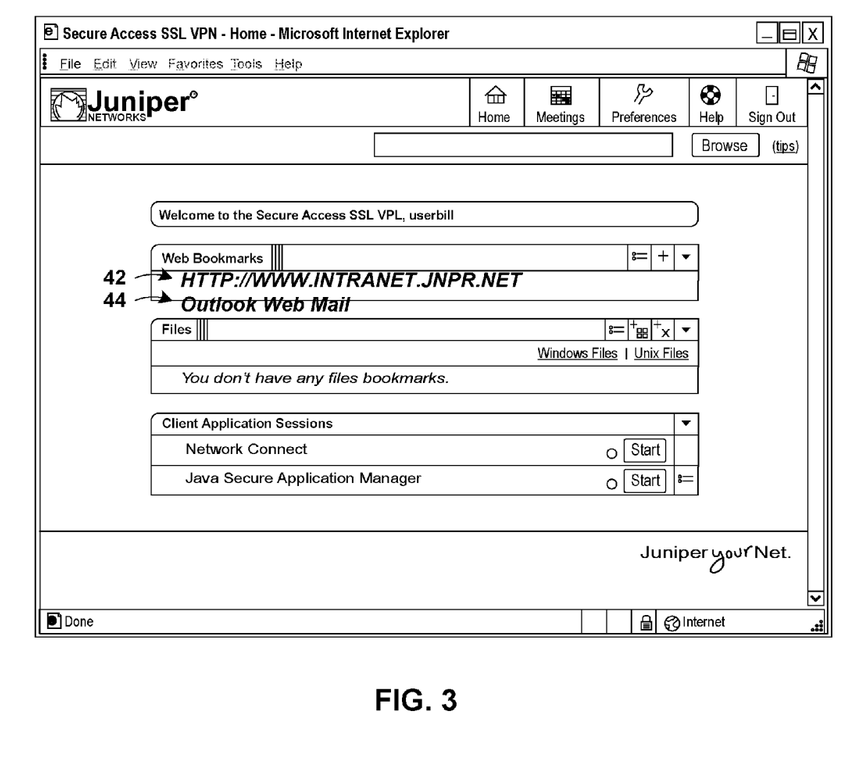
FIG. 3 shows an example user home web page presented to the user via the web browser when accessing the VPN concentrator via the client device.

FIG. 3 shows an example user home web page presented to the user via the web browser when accessing VPN concentrator 18A via client device 4. As shown in FIG. 3, the web page presents a list of bookmarks that allow the user to easily navigate protected resources 14 using hypertext markup language (HTML) inks. In this example, FIG. 3 shows a first link 42 to an intranet file server provided by the enterprise and a second link 44 to enterprise web mail for the user.

Figure 4:
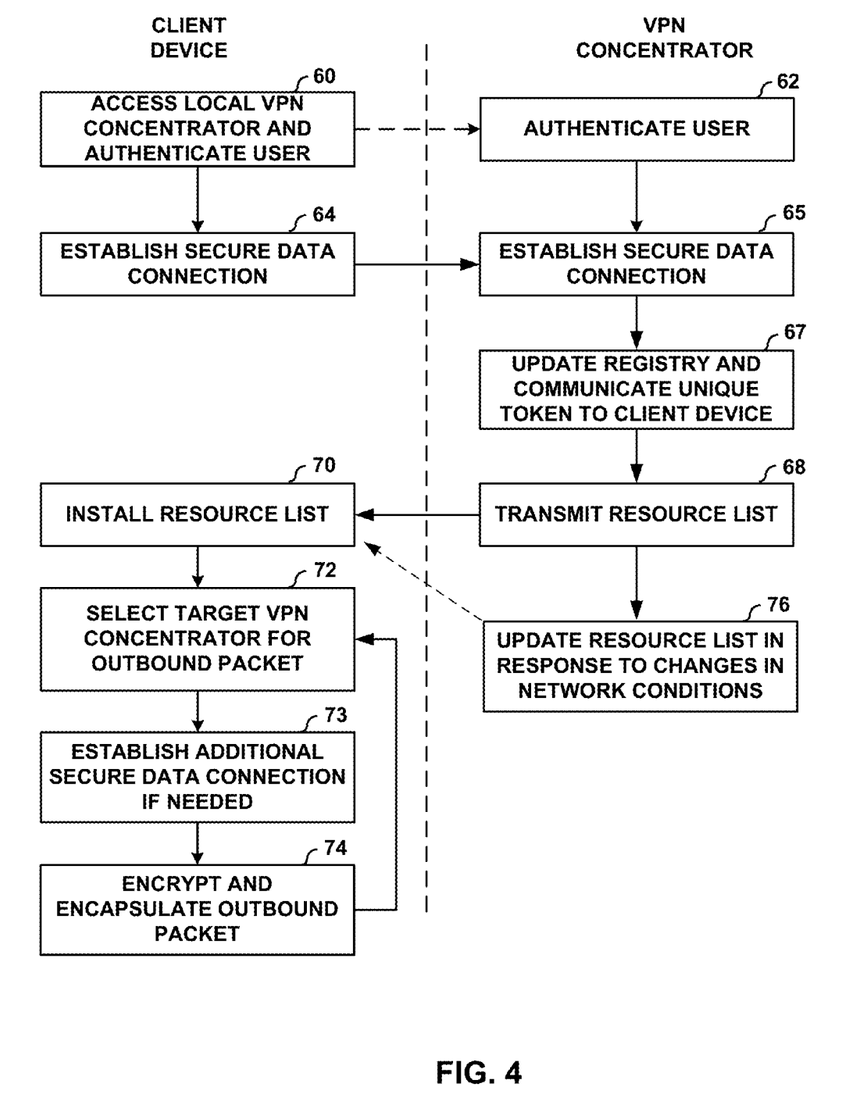
FIG. 4 is a flowchart showing example operation of the network environment of FIG. 1

FIG. 4 is a flowchart showing an example operation of network environment 2 of FIG. 1. Initially, VPN handler 5 executing on client device 4 initiates access to enterprise network 10 via local VPN concentrator 18A and provides credentials to authenticate the user (60, 62). During this process, VPN handler 5 and VPN concentrator 18A exchange any keying information and establish secure data connection 15 (64, 65).

In order to avoid client device 4 being forced to re-authenticate to other VPN concentrators (e.g., VPN concentrator 18B), VPN concentrators 18 may share access to an internal registry of currently authenticated users and may update the registry upon authenticating a user or terminating a user session. AAA server 21 may, for example, host the registry. Upon authenticating client device 4, VPN concentrator 18A may generate a unique token, e.g., a random number, and communicate the token to client device 4 by way of a session cookie (67). In addition, VPN concentrator 18A may update the registry to store the unique token or, alternatively, may communicate the data element directly to VPN concentrator 18B. In the event secure data connection 17 needs to be established, VPN handler 5 transmits the data element to VPN concentrator 18B for verification against the registry, thereby allowing VPN concentrator 18B to confirm that client device 4 need not be re-authenticated prior to proceeding with the establishment of secure data connection 17. In this way, secure data connection 17 may be seamlessly established when necessary so that client device 4 may gain efficient and direct access to resources 14B via VPN concentrator 18B.

In addition, upon successful authentication, VPN concentrator 18A may provide VPN handler 5 with configuration information to control whether connectivity to remote enterprise resources (e.g., resources 14B) is provided via secure cross-connect 19 or via a separate, direct secure data connection 17 (68). For example, VPN concentrator 18A may provide configuration data in the form of a resource list that identifies resources 14A that are local to VPN concentrator 18A. The resource list may specify individual or a range of network address (e.g., private IP addresses) for resources 14A accessible by local VPN concentrator 18A. The configuration data may also specify a network address of default VPN concentrator 18 (e.g., VPN concentrator 18B) to be used to service requests for other enterprise resources not associated with local VPN concentrator 18A. Alternatively, the resource list may specify groups of resources 14 serviced by corresponding VPN concentrators 18 of enterprise network 10. For example, the resource list may specify the network addresses of resources 14A in association with a network address of VPN concentrator 18A and, similarly, network addresses of resources 14B and a network address of VPN concentrator 18B. In this way, the resource list provides a mapping of the resources of the enterprise network to the multiple VPN concentrators that have been deployed to provide secure access to those resources. The network addresses of VPN concentrators 18 may be globally routable IP addresses while the network addresses of resources 14 may be private network addresses or ranges of addresses routable only within enterprise network 10.

In other examples, VPN concentrator 18A may provide configuration information in a form that specifies which VPN concentrators 18 to use based on one or more other factors, such as a type of protocol or application being used, a time of day, status information received from the VPN concentrators regarding current loading and the like. For example, the configuration information may specify that VPN handler 5 is to direct email access requests to VPN concentrator 18A while access requests for corporate video streaming (e.g. via the Real-time Transport Protocol) are to be directed to VPN concentrator 18B.

In one example, the techniques may utilize a vendor-neutral authorization data model, such as a data model defined by an Interface for Metadata Access Point (IF-MAP) standard, to provide the configuration information including the resource list. An enterprise device, such as an IF-MAP server, may be used in conjunction with AAA server 21 to store and provide authorization information in accordance with the IF-MAP data model. Network devices, such as AAA server 21, VPN concentrators 18, routers 16 and L2 switches, may publish and retrieve IF-MAP authorization information to and from the IF-MAP server. Local VPN concentrator 18A and/or AAA server 21 may, as one example, implement Trusted Network Connect (TNC) techniques to verify a behavior of client device 4 requesting access to enterprise network 10. TNC generally requires that client device 4 include a trusted agent that evaluates the behavior of its host endpoint device and reports this behavior as health and other information. AAA server 21 and/or local VPN concentrator 18A may evaluate this behavior information, e.g., the health and other information, by applying authentication policies to determine whether client device 4 is operating according to pre-defined and trusted behavior or, in other words, is secure and healthy. In this respect, AAA server 21 may implement a form of Network Access Control (NAC) by which to control access to enterprise network 16. AAA server 21 and routers 16 and/or network switches (not shown) may, for example, implement a form of NAC defined in an Institute of Electrical and Electronics Engineers (IEEE) standard referred to as 802.1X. More information concerning the IEEE 802.1X standard can be found in IEEE standard 802.1X-2004, entitled "802.1X IEEE standard for Local and Metropolitan Area Networks, Port Based Network Access Control," dated Dec. 13, 2004, hereby incorporated by reference as if fully set forth herein. In the context of the IEEE 802.1X standard, AAA server 21 may generally represent a policy decision point or authentication server that applies one or more pre-defined authentication policies to evaluate security credentials and possibly other information, such as the above described behavior information, to authenticate a supplicant device, which is represented in this case as one of endpoint devices 26. Routers 16 or other network switches may represent, in the context of the IEEE 802.1X standard, a policy enforcement point or authenticator that initially challenges client device 4 requesting access to enterprise network 16 for authentication information, e.g., the above described security credentials. In this case, VPN handler 5 may be embedded within or otherwise cooperate with the trusted TNC client executing on client device 4. In this way, central control and management of the resource list may be provided by the IF-MAP server, which is used to share the configuration data between resources, such as VPN concentrators 18 and VPN handler 5.

In another example, VPN concentrator 18A may communicate the resource list to client device 4 using an active directory server to provide profile information, such as personal firewall settings, for the client device. In such an environment, this mechanism for configuring client device 4 may be leveraged to communicate additional configuration information, e.g., the resource list, to VPN handler 5 along with the personal firewall settings. VPN handler 5 parses the resource list from the other configuration information and utilizes the resource list as described herein. As another example, delivery of the resource list may be accomplished at the time secure data connection 15 is established by modifying the protocol used to negotiate and establish the VPN tunnels. A data field within the handshake messages of the protocol may be redefined to carry the resource list. For example, VPN handler 5 and VPN concentrator 18A may use the Internet Key Exchange (IKE) protocol to negotiate secure data connection 15 as an IPSec tunnel. In this case, a field defined by the IKE protocol, such as the vendor ID field, may be redefined to carry the resource list or a file name of the current resource list to be retrieved by VPN handler 5. Upon receiving the resource list, VPN handler 5 stores the resource list within client device 4 to control selection and utilization of VPN concentrators 18 of enterprise network 10 (70).

The following illustrates an example resource list in extensible markup language (XML) format:

```
<vpn concentrator>
    <name>Local VPN</name>
    <global address>10.1.1.1</global address >
    <resources>
        <range>192.168.1.0 - 192.168.1.255</range>
    </resources>
</vpn concentrator>
<vpn concentrator>
    <name>Corporate VPN</name>
    <global address>10.1.1.2</global address >
    <resources>
        <range>192.168.2.0 - 192.168.2.255</range>
    </resources>
</vpn concentrator>
```

VPN handler 5 processes outbound network communications of client device 4 and, at this time, determines whether a given outbound network communication is to be tunneled to local VPN concentrator 18A via secure data connection 15 or to a different VPN concentrator, such as VPN concentrator 18B via secure data connection 17 (72). For example, VPN handler 5 compares a destination IP address of the output network communication (e.g., IP packet) to the resource list received from VPN concentrator 18A. If the destination address matches a network address of a resource 14A associated with VPN concentrator 18A, VPN handler 5 encrypts and encapsulates the network communication within secure data connection 15 and outputs the packet for routing to VPN concentrator 18A (74). In the event VPN handler 5 detects an outbound network access request for any of the non-local resources (e.g., resources 14B), the VPN handler automatically creates secure data connection 17 that provides direct access to VPN concentrator 18B in the event client device 4 requests access to resources 14B of network site 12B (73). That is, rather than relying on secure cross-connect 19 provided by VPN concentrators 18, VPN handler 5 utilizes the resource list to determine that a requested resource 14B is located within enterprise network 10 but physically located within network site 12B that is serviced by a different VPN concentrator, namely VPN concentrator 18B. If secure data connection 17 has not yet been established, VPN handler 5 constructs the secure data connection to provide a direct VPN tunnel to VPN concentrator 18B. After constructing secure data connection 17, VPN handler 5 encrypts and encapsulates the network communication within secure data connection 17 for routing to VPN concentrator 18B (74).

In this way, VPN handler 5 may avoid burdening local VPN concentrator 18A from having to operate as a proxy or otherwise exchange data communications between secure data connection 15 and secure cross-connect 19. This may reduce bandwidth load on local VPN concentrator 18A as well as possibly reduce latency experienced by client device 4 that would otherwise result from local VPN concentrator 18A hair-pinning the traffic directed to resources 14B associated with remote VPN concentrator 18B. Moreover, the technique may avoid any requirement that local VPN concentrator 18A operate as a proxy to retrieve requested resources 14B through secure cross-connect 19 and may avoid repetitive encryption and decryption services associated with this proxy operation.

In some embodiments, VPN concentrator 18A monitors network conditions and dynamically pushes updated resource lists to VPN handler 5 in response to changes to those conditions (76). In this way, VPN concentrator 18A may dynamically control usage of VPN concentrators 18 by client device 4. For example, VPN concentrator 18A may monitor various network conditions including current loading conditions and available bandwidth. When the network conditions reach a threshold indicative of a resource shortage, such as a shortage of local bandwidth, VPN concentrator 18A may construct a new resource list and send the updated resource list to client device 4. The updated resource list may cause client device 4 to direct requests to VPN concentrator 18B for resources 14 that are redundantly available through network site 12B. As such, it is expected that the user's experience is improved by, for example, decreased latency of the information sharing. This may be readily noticeable to the user for real-time traffic, such VoIP communication sessions or video conferences, that utilize resources 14B of network site 12B. It is expected that public network 6 will select the shortest and/or best path between network site 12B and a local ISP to which client device 4 is connected. It is expected that this path will nearly always be shorter than the path for secure data connections 15, 19 where local VPN concentrator 18A would be required to hair pin traffic between the connections.

Figure 5:
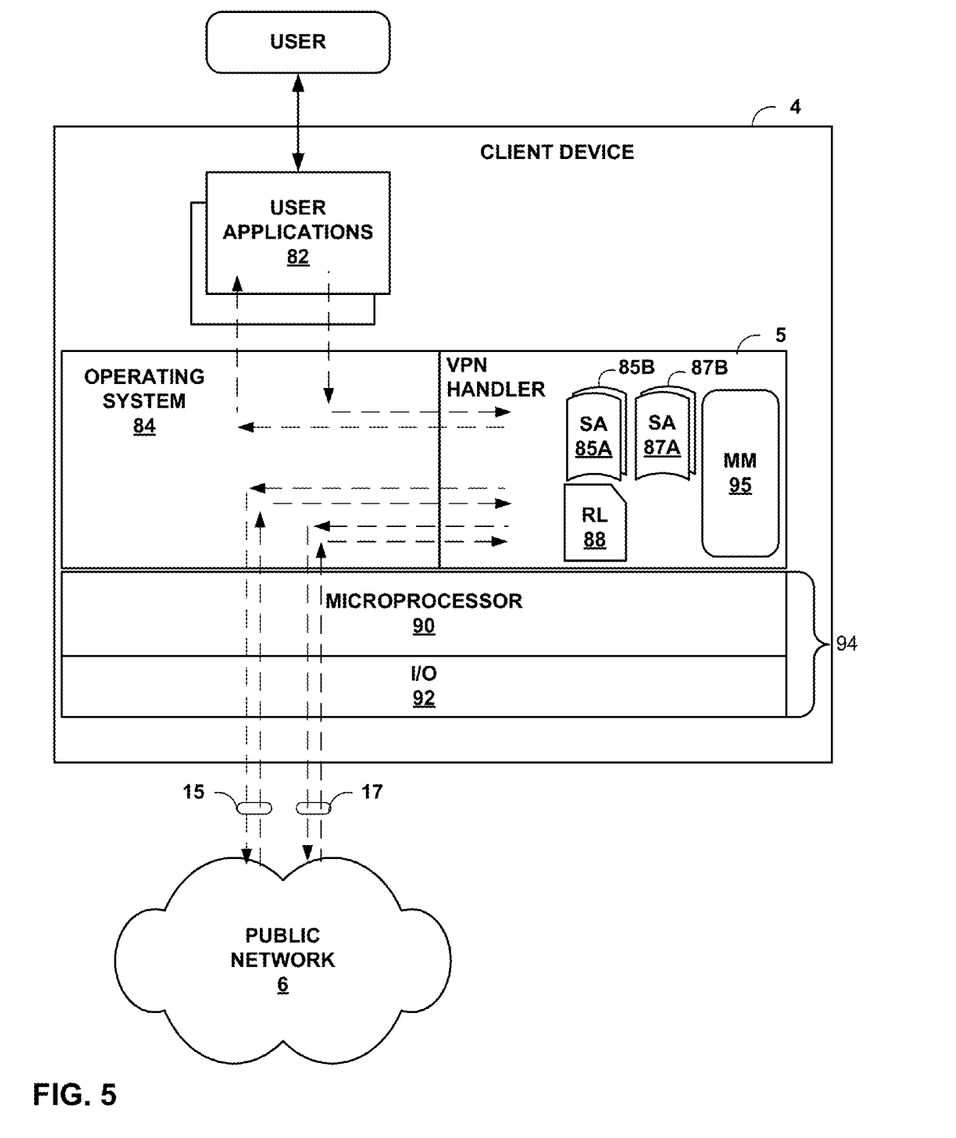
FIG. 5 is a block diagram of an example embodiment of a client device that operates in accordance with the techniques described herein.

FIG. 5 is a block diagram of an example embodiment of client device 4 that operates in accordance with the techniques described herein. In this example, client device 4 includes hardware 94 that provides core functionality for operation of the device. Hardware 94 may include one or more programmable microprocessors 90 configured to operate according to executable instructions (i.e., program code), typically stored in a computer-readable medium such as a static, random-access memory (SRAM) device or a Flash memory device. I/O 92 provides a network interface for communicating with public network 6. The network interface may be a wired or wireless interface, such as an Ethernet, fiber optic, token ring, modem, or other network interface. Hardware 94 may include additional discrete digital logic or analog circuitry.

Operating system 84 executes on microprocessor 90 and provides an operating environment for one or more applications (commonly referred to "apps"). In one example, operating system 84 provides an interface layer of for receiving kernel calls from user applications 82. In addition, operating system 84 provides a framework within which VPN handler 5 operates and may, for example, allow VPN handler 5 to execute within a "user" space of the operating environment provided by client device 4. Operating system 84 may, for example, provide access to lower levels of the OSI stack for routing packets to and from the secure data connections 15, 17, ensuring Domain Name System (DNS) resolvers are set correctly for the VPN, and the like. As shown in FIG. 5, operating system 84 routes inbound communications to VPN handler 5 for processing. VPN handler 5 may register with operating system 84 to provide a single point of entry for network traffic so as to transparently apply VPN services to the network traffic.

As illustrated in FIG. 5 VPN handler 5 stores resource list (RL) 88 received from local VPN concentrator 18A. Resource list 88 may take the form of a file, database, data structure or other repository for storing information describing the reachability of resources 14 through the VPN concentrators 18 of the enterprise. Upon establishing secure data connection 15 to local VPN concentrator 18A, VPN handler 5 creates a pair of security associations (SAs) 85A, 85B, one for encrypting outbound communications for the secure data connection 15 and one for decrypting inbound communications received from secure data connection 17. In the event VPN handler 5 detects an outbound communication for any of the non-local resources (e.g., resources 14B), the VPN handler utilizes resource list 88 to select VPN concentrator 18B and automatically creates secure data connection 17 to provide direct access to VPN concentrator 18B. At this time, VPN handler 5 creates a second pair of security associations 87A, 87B to encrypt output communications for secure data connection 17 and decrypt inbound communications received from secure data connection 17. In accordance with the conditions and rules set out in resource list 88, VPN handler 5 selectively applies the SAs 85, 87 to outbound network communications produced by user applications 82 based on a variety of factors, such as destination address (e.g., IP address), type of application or protocol based on deep packet inspection or application-layer data associated with the network communications, time of day, or other criteria. In one example embodiment, VPN handler 5 includes management module ("MM") 95 that communicates with local VPN concentrator 18A, e.g., by way of a dedicated socket, to receive updated resource lists.

Figure 6:
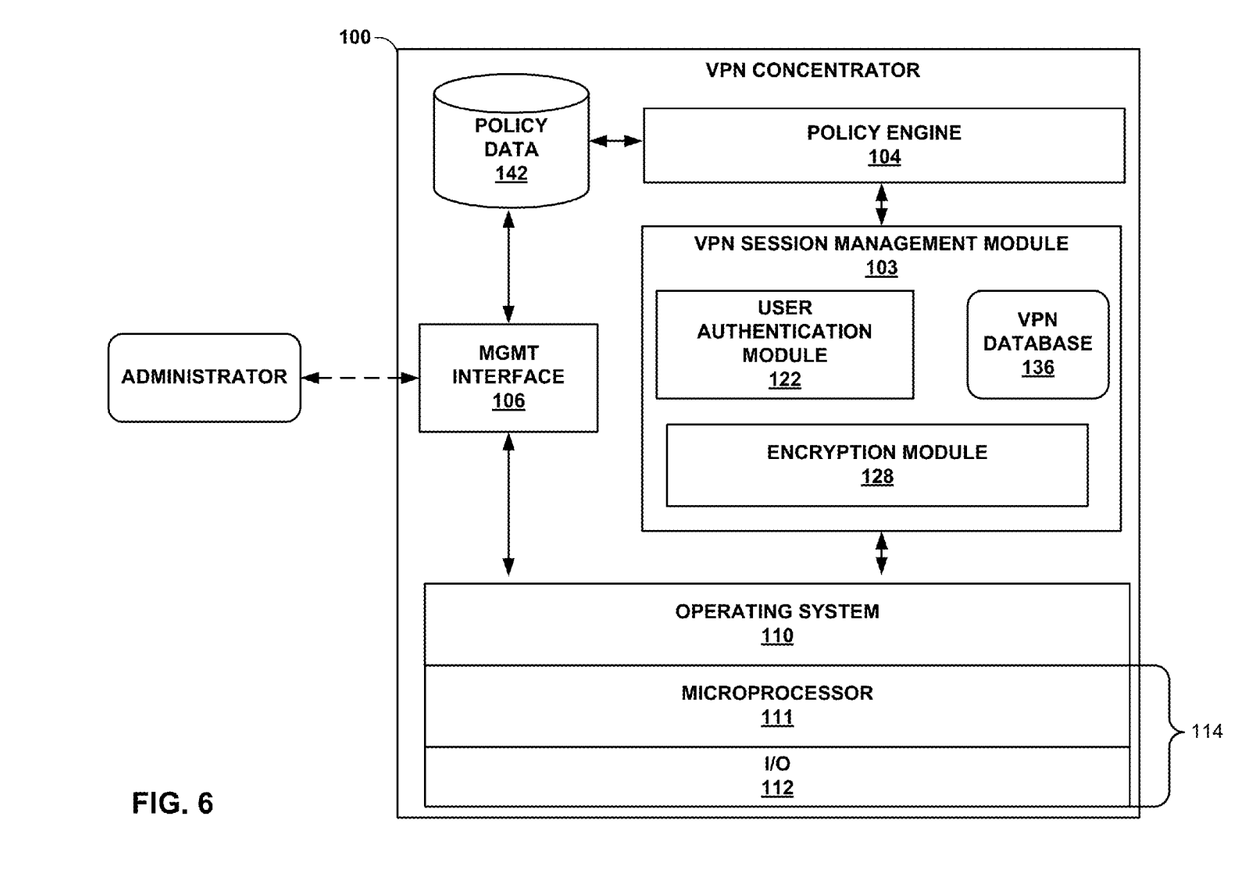
FIG. 6 is a block diagram illustrating an example VPN concentrator.

FIG. 6 is a block diagram illustrating an example VPN concentrator 100 which authenticates remote users and establishes a secure data connection to remote user devices. VPN concentrator 100 is an exemplary embodiment of VPN concentrators 18A, 18B of FIG. 1. VPN concentrator 100 provides secure data connections to an enterprise network using one or more security schemes, such as Secure Sockets Layer (SSL) or Transport Layer Security (TLS). In this example, VPN concentrator 100 includes hardware 114 that provides core functionality for operation of the device. Hardware 114 may include one or more programmable microprocessors 111 configured to operate according to executable instructions (i.e., program code), typically stored in a computer-readable medium such as a static, random-access memory (SRAM) device or a Flash memory device. I/O 112 provides a network interface for sending and receiving network packets to facilitate communication between VPN concentrator 100 and other network devices, including other VPN concentrators, client devices and protected resources. The network interface may be a wired or wireless interface, such as an Ethernet, fiber optic, token ring, modem, or other network interface. Hardware 114 may include additional discrete digital logic or analog circuitry.

Operating system 110 executes on microprocessor 111 and provides an operating environment for a variety of software modules such as, in this example, VPN session management module 103, management interface 106, and policy engine 104.

VPN session management module 103 provides and manages VPN sessions with remote users of a protected network. In this example, VPN session management module 103 includes a user authentication module 122 and a VPN database 136 to track current VPN sessions. User authentication module 122 authenticates remote clients (e.g., client device 4) to facilitate access requests by the clients to resource network 14. VPN database 136 is a data structure that stores and maintains VPN session data for various VPN sessions created and administered by VPN session management module 103. VPN session data may include, for example, information regarding VPN tunnels, endpoint addresses, access control, security levels, and encryption information.

In response to an initial request for access to a protected resource 14, user authentication module 122 requests and receives credentials from the requesting one of the users. User authentication module 122 validates the credentials to authenticate the user and directs VPN session management module 103 to create a VPN session for the user. VPN session management module 103 creates the VPN session for the user and adds the session to VPN database 136. Thereafter, VPN concentrator 100 and the client device (e.g., client device 4) communicate using the VPN session (e.g., secure data connection 15). In some embodiments, user authentication module 122 authenticates users by communicating with a RADIUS or other AAA server (e.g., AAA server 21).

VPN session management module 103 further includes encryption module 128. Encryption module 128 enables and executes an encryption scheme for securing data connections. Encryption module 128 may implement, for example, SSL, TLS, or another method for securing data connections to form one or more secure data connections between VPN concentrator 100 and other network devices. For example, encryption module 128 may establish an SSL channel for a VPN session between client devices and VPN concentrator 100. In this example, therefore, a VPN tunnel for the VPN session transports application data encrypted by encryption module 128 according to the established SSL channel. Each of the secure data connections may be established according to one-way or two-way authentication.

Policy engine 104 is a decision engine that defines behaviors of VPN concentrator 100 with regard to, for example, generating resource lists to direct individual remote client devices to specific VPN concentrators within the enterprise. Policy engine 140 access policy data 142 in the form of policy rules. In general, a policy rule specifies an action that policy engine 104 is to take on occurrence of some condition monitored by VPN concentrator 100. Policy rules may be expressed as conditional statements, for example, with respect to various network conditions including current loading conditions and available bandwidth. Policy engine 104 monitors the network conditions and, upon determining satisfaction of the rules set forth in any of the policies, dynamically pushes updated resource lists to remote VPN handlers (e.g., VPN handler 5) in response to changes to those conditions. In this way, VPN concentrator 18A may dynamically control usage of VPN concentrators by client devices.

Various embodiments of the invention have been described. These and other embodiments are within the scope of the following claims.

The invention claimed is:

1. A method comprising:
    establishing, with a virtual private network (VPN) handler executing on a client device, a first VPN connection to a first VPN concentrator of an enterprise network;
    receiving with the VPN handler a network address of a second VPN concentrator and a resource list from the first VPN concentrator, wherein the resource list maps a set of resources of the enterprise network to the first VPN concentrator and the second VPN concentrator of the enterprise network;
    processing an outbound network communication with the VPN handler to determine a target resource of the enterprise network for the outbound network communication;
    comparing the target resource to the resource list to determine whether the target resource of the enterprise network is serviced by the first VPN concentrator;
    when the target resource is serviced by the first VPN concentrator, forwarding the outbound network communication from the client device to the first VPN concentrator via the first VPN connection; and
    when the target resource is not serviced by the first VPN concentrator, automatically establishing a second VPN connection from the VPN handler of the client device to the second VPN concentrator of the enterprise network and forwarding the outbound network communication to the second VPN concentrator via the second VPN connection.

2. The method of claim 1, further comprising:
    receiving an updated resource list from the first VPN concentrator, wherein the updated resource list specifies an updated entry previously designating one of the resources as being serviced by the first VPN concentrator as currently being serviced by the second VPN concentrator;
    after receiving the updated resource list, receiving with the VPN handler an outbound network communication destined for the resource designated by the updated entry; and
    based on the updated resource list, forwarding the outbound network communication to the second VPN concentrator via the second VPN connection.

3. The method of claim 1, wherein the resource list specifies that the set of resources are serviced by the first VPN concentrator.

4. The method of claim 1, wherein the resource list specifies that the set of resources are serviced by the second VPN concentrator.

5. The method of claim 1,
    wherein the resource list specifies network addresses for the set of resources,
    wherein processing the outbound communication comprises extracting a destination address from the outbound communication, and
    wherein comparing the target resource to the resource list comprises comparing the destination address to the network addresses specified by the resource list to determine whether the network addresses are serviced by the first VPN concentrator or the second VPN concentrator.

6. The method of claim 1,
    wherein establishing the first VPN connection to the first VPN concentrator comprises using a modified tunnel establishment protocol to establish the first VPN connection, and
    wherein receiving the resource list comprises receiving the resource list within one or more data fields of the modified tunnel establishment protocol when establishing the first VPN connection.

7. The method of claim 1,
    wherein establishing the first VPN connection to the first VPN concentrator comprises transmitting user credentials from the client device to the first VPN concentrator to authenticate a user associated with the client device, and
    wherein receiving the resource list comprises, in response to authenticating the user, receiving the resource list as a portion of an active directory profile associated with the user.

8. A network device comprising:
    a microprocessor;
    an operating system executing on the microprocessor to provide an operating environment for application software;
    a virtual private network (VPN) network handler executing on the microprocessor to establish a first VPN connection with a first VPN concentrator of an enterprise network for securely tunneling network packets between the network device and the first VPN concentrator,
    wherein upon establishing the VPN connection the VPN network handler receives a resource list from the first VPN concentrator that specifies a set of resources of the enterprise network and a second VPN concentrator of the enterprise network, and
    wherein the VPN network handler processes an outbound network communication from the application software by determining a target resource of the enterprise network for the outbound network communication and automatically establishing a VPN connection from the VPN network handler to the second VPN concentrator of the enterprise network when the target resource is not serviced by the first VPN concentrator.

9. The network device of claim 8, wherein the VPN network handler is configured to:
    compare the target resource to the resource list to determine whether the target resource of the enterprise network is serviced by the first VPN concentrator,
    forward the outbound network communication from the client device to the first VPN concentrator via the first VPN connection when the target resource is serviced by the first VPN concentrator, and
    automatically establish the second VPN connection and forward the outbound network communication to the second VPN concentrator via the second VPN connection when the target resource is not serviced by the first VPN concentrator.

10. The network device of claim 8, wherein the VPN network handler further includes a management module to receive an updated resource list from the first VPN concentrator, wherein the updated resource list specifies an updated one of the resources previously designated as being serviced by the first VPN concentrator as currently being serviced by the second VPN concentrator.

11. The network device of claim 10, wherein, after receiving the updated resource list via the management module, the VPN network handler receives an outbound network communication destined for the updated one of the resources and, based on the updated resource list, forwards the outbound network communication to the updated one of the resources to the second VPN concentrator via the second VPN connection.

12. The network device of claim 8, wherein the VPN network handler stores at least two sets of security associations securely communicating with the enterprise network including a first pair of security associations for the first VPN connection to the enterprise network and a second pair of security associations for the second VPN connection to the enterprise network.

13. The network device of claim 12, wherein the VPN network handler selectively applies the pairs of security associations to encrypt and decrypt network communications with the enterprise network to securely tunnel the network communications between the client device and the enterprise network through the first VPN connection and the second VPN connection based on the resource list.

14. The network device of claim 8,
wherein the VPN network handler uses a modified tunnel establishment protocol to establish the first VPN connection, and
wherein the VPN network handler receives the resource list within one or more data fields of the modified tunnel establishment protocol when establishing the first VPN connection.

15. The network device of claim 8,
wherein the VPN network handler transmits user credentials from the client device to the first VPN concentrator to authenticate a user associated with the client device, and
wherein the VPN network handler, in response to authenticating the user, receives the resource list from an active directory server of the enterprise as a portion of an active directory profile associated with the user.

16. A method comprising:
establishing, with a first virtual private network (VPN) concentrator of an enterprise network, a first VPN connection between the enterprise network and a remote client device; and
upon establishing the first VPN connection, sending from the first VPN concentrator to the client device a network address of a second VPN concentrator and a resource list, wherein the resource list maps a set of resources of the enterprise network to the first VPN concentrator and the second VPN concentrator of the enterprise network to direct the remote client device to establish a second VPN connection to the second VPN concentrator based upon the resources of the enterprise network accessed by the client device.

17. The method of claim 16, further comprising:
monitoring network conditions of the enterprise network;
in response to a change in the network conditions, sending an updated resource list from the first VPN concentrator to the client device, wherein the updated resource list provides a different mapping of the set of resources to the first VPN concentrator and the second VPN concentrator.

18. The method of claim 16,
wherein establishing the first VPN connection comprises using a modified tunnel establishment protocol to establish the first VPN connection, and
wherein sending the resource list comprises sending the resource list within one or more data fields of the modified tunnel establishment protocol.

19. The method of claim 16,
wherein establishing the first VPN connection comprises receiving user credentials from the client device and accessing an active directly server to authenticate a user associated with the client device and receive a user profile associated with the user, and
wherein sending the resource list comprises, in response to authenticating the user, sending the resource list as a portion of the active directory profile associated with the user.

20. The method of claim 16, further comprising receiving, with the first VPN concentrator, vendor-neutral authorization information from an Interface for Metadata Access Point (IF-MAP) server, wherein the authorization information includes resource list.

21. The method of claim 20, further comprising
monitoring network conditions of the enterprise network;
in response to a change in the network conditions, publishing an updated resource list to the IF-MAP server, wherein the updated resource list provides a different mapping of the set of resources to the first VPN concentrator and the second VPN concentrator.

22. A virtual private network (VPN) concentrator of an enterprise network comprising:
a microprocessor;
an operating system executing on the microprocessor;
a virtual private network (VPN) session management module executing on the microprocessor to establish a first VPN connection for securely tunneling network packets between a remote client device and the VPN concentrator;
a policy engine storing policy data that define rules for generating a resource list that maps a set of resources of the enterprise network to the VPN concentrator and a second VPN concentrator of the enterprise network to direct the remote client device to establish a second VPN connection to the second VPN concentrator based upon the resources of the enterprise network requested by the remote client device.

23. The VPN concentrator of claim 22, wherein the policy engine monitors network conditions of the enterprise network and, in response to a change in the network conditions, applies the policies to generate and transmit an updated resource list to the client device, wherein the updated resource list provides a different mapping of the set of resources to the first VPN concentrator and the second VPN concentrator.

24. The VPN concentrator of claim 23, wherein the network conditions include current loading conditions on the first VPN concentrator and an available amount of bandwidth of the first VPN concentrator.

25. The VPN concentrator of claim 22, wherein the policy engine applies the policies to generate and transmit an updated resource list to the client device based on a time of day.

26. The VPN concentrator of claim 22, wherein the policy engine applies the policies to generate and transmit an updated resource list to the client device based status information received from the second VPN concentrator.

27. A non-transitory computer-readable medium comprising instructions for causing a programmable processor to:
establish, with a virtual private network (VPN) handler executing on a client device, a first VPN connection to a first VPN concentrator of an enterprise network;

receive with the VPN handler a resource list from the first VPN concentrator, wherein the resource list specifies a set of resources of the enterprise network and a second VPN concentrator of the enterprise network;

process an outbound network communication with the VPN handler to determine a target resource of the enterprise network for the outbound network communication;

compare the target resource to the resource list to determine whether the target resource of the enterprise network is serviced by the first VPN concentrator;

when the target resource is serviced by the first VPN concentrator, forward the outbound network communication from the client device to the first VPN concentrator via the first VPN connection; and when the target resource is not serviced by the first VPN concentrator, automatically establish a second VPN connection from the VPN handler of the client device to the second VPN concentrator of the enterprise network and forwarding the outbound network communication to the second VPN concentrator via the second VPN connection.

* * * * *